(No Model.) 6 Sheets—Sheet 3.

N. A. RANSOM.
IRONING MACHINE.

No. 449,702. Patented Apr. 7, 1891.

Witnesses
E. D. Smith
Alex J. Stewart

Inventor
Newman A. Ransom,
By his Attorneys
Church & Church (No Model.) 6 Sheets—Sheet 4.
N. A. RANSOM.
IRONING MACHINE.

No. 449,702. Patented Apr. 7, 1891.

Witnesses
Inventor
Newman A. Ransom,
By his Attorneys
Church & Church (No Model.) N. A. RANSOM.
IRONING MACHINE.
No. 449,702. Patented Apr. 7, 1891.
6 Sheets—Sheet 5.
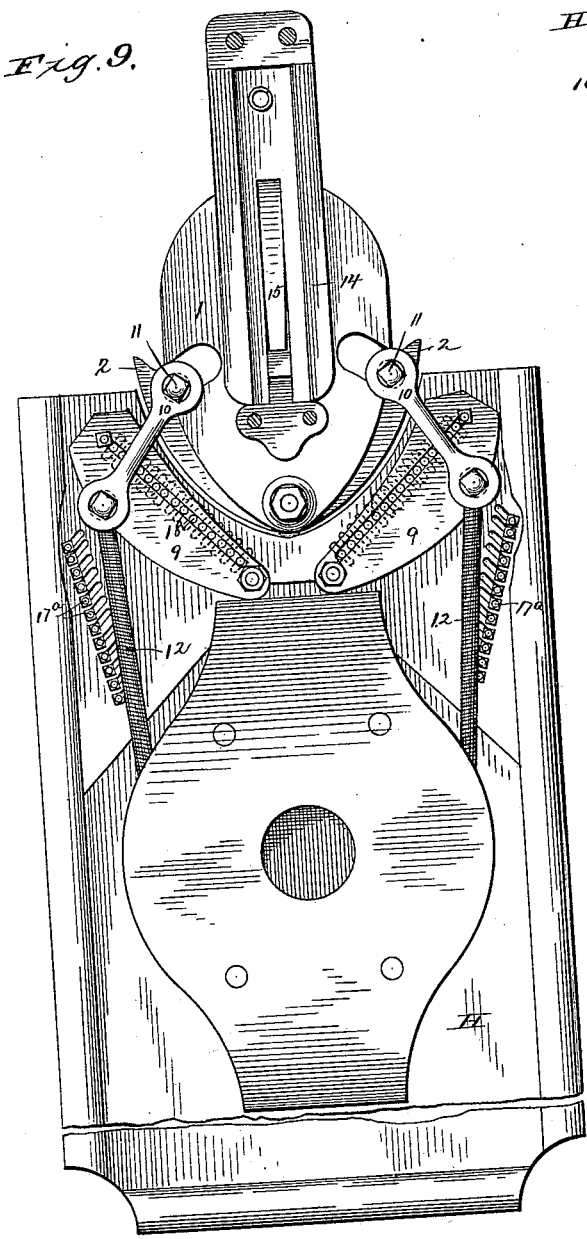
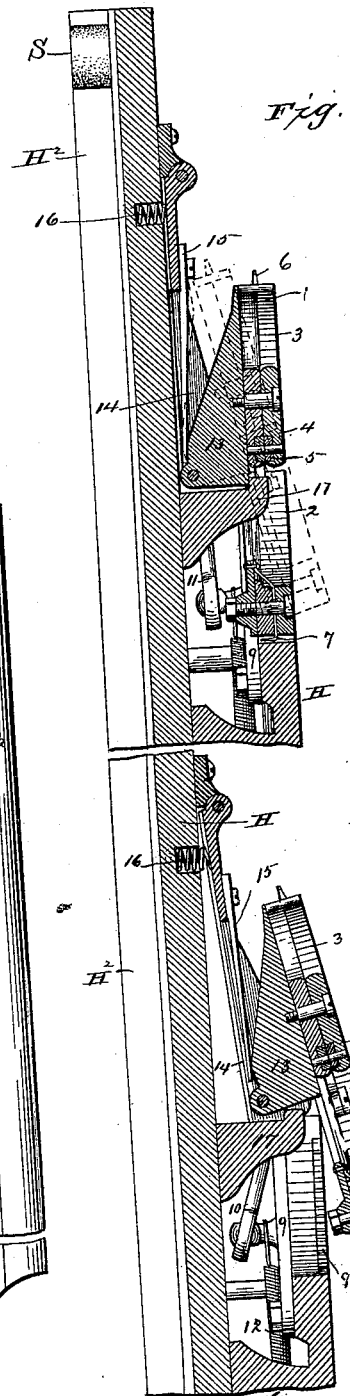
Witnesses
E. D. Smith
Alex S. Stuart
Inventor
Newman A. Ransom,
By his Attorneys
Church & Church (No Model.) 6 Sheets—Sheet 6.

N. A. RANSOM.
IRONING MACHINE.

No. 449,702. Patented Apr. 7, 1891.

Witnesses
E. B. Smith
Alex J. Stewart

Inventor
Newman A. Ransom,
By his Attorneys
Church & Church

UNITED STATES PATENT OFFICE.

NEWMAN A. RANSOM, OF CHICAGO, ILLINOIS.

IRONING-MACHINE.

SPECIFICATION forming part of Letters Patent No. 449,702, dated April 7, 1891.

Application filed September 28, 1889. Serial No. 325,436. (No model.)

*To all whom it may concern:*

Be it known that I, NEWMAN A. RANSOM, of Chicago, in the county of Cook and State of Illinois, have invented certain new and useful Improvements in Ironing-Machines; and I do hereby declare the following to be a full, clear, and exact description of the same, reference being had to the accompanying drawings, forming a part of this specification, and to the figures and letters of reference marked thereon.

This invention relates particularly to ironing-machines, such as are especially adapted for ironing shirt-bosoms, and are hence termed "shirt-machines," although many features of the invention are adapted for use in connection with other machines of a like character.

The object of the invention is to cure certain defects heretofore existing in this class of machinery and to produce a machine capable of doing the work in better style, more rapidly, and with less fatigue to the operator than has heretofore been deemed possible; to which ends the invention consists, first, in a machine embodying two ironing-rollers with a reciprocating table and a single point of pressure therefor intermediate the rollers, whereby the pressure is equalized on the rollers; secondly, in mounting the table and its immediate operating parts on a single support, whereby the inclination of the same may be varied; thirdly, it consists in an adjustable neckband-holder adapted to fit any sized shirt and to hold the same firmly in the shape in which it is made without danger of stretching or injuring the same, and which will enable the whole bosom to be ironed at once; and, finally, it consists in certain novel details in the construction and combinations and arrangements of the various parts, to be hereinafter described, and pointed out particularly in the claims at the end of this specification.

Figure 1:
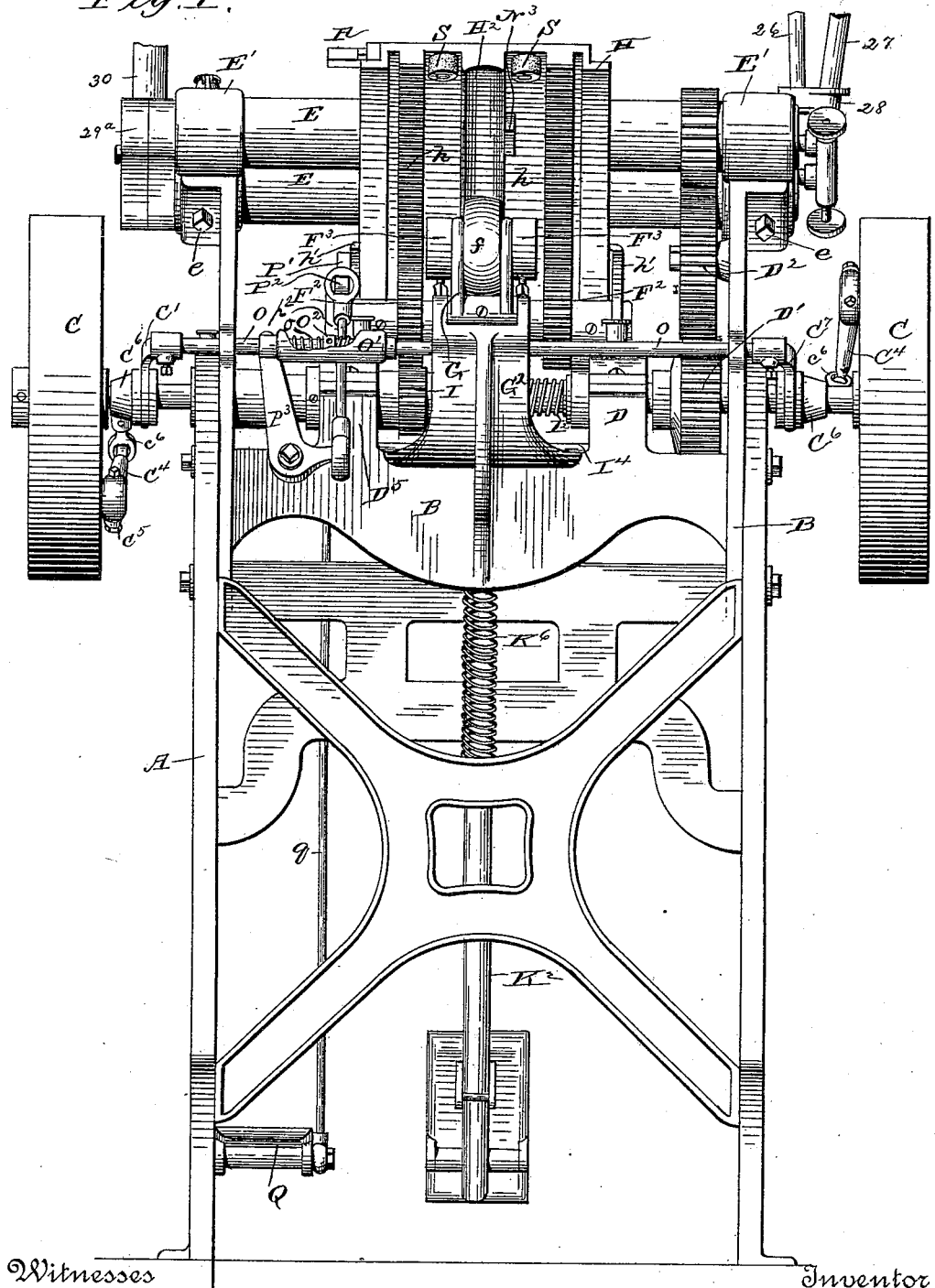
Figure 2:
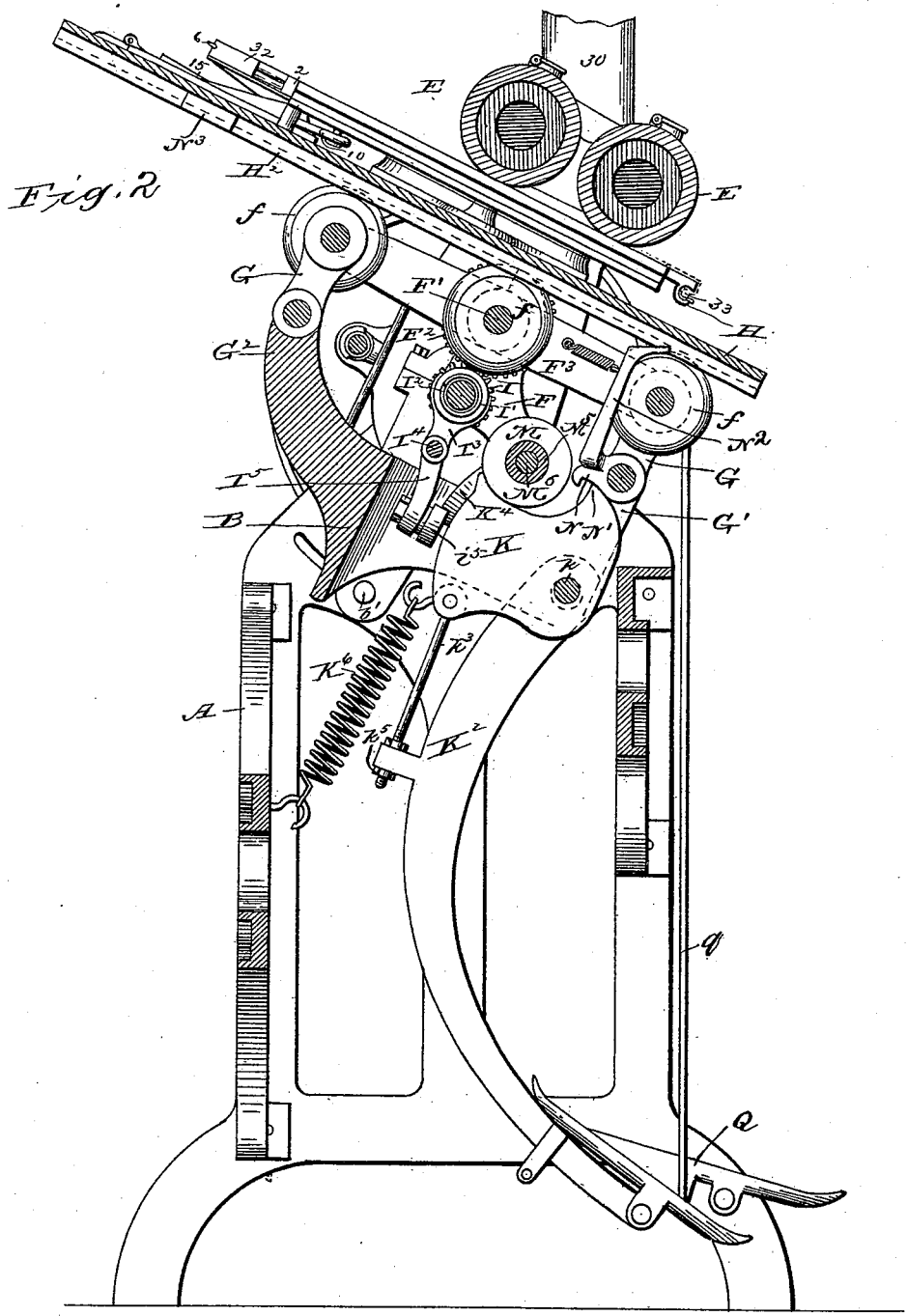
Figures 3, 4:
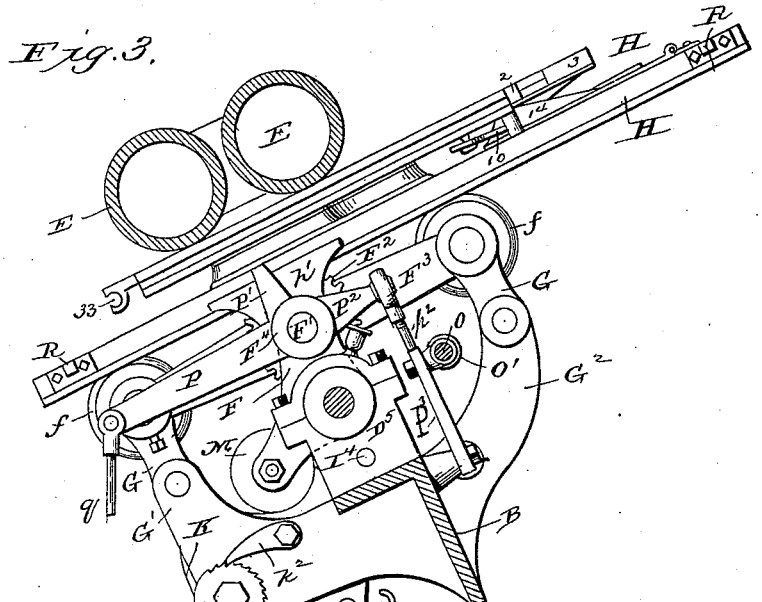
Figure 5:
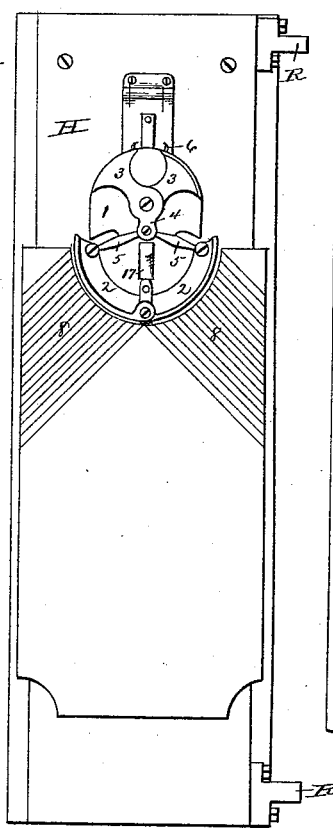
Figure 6:
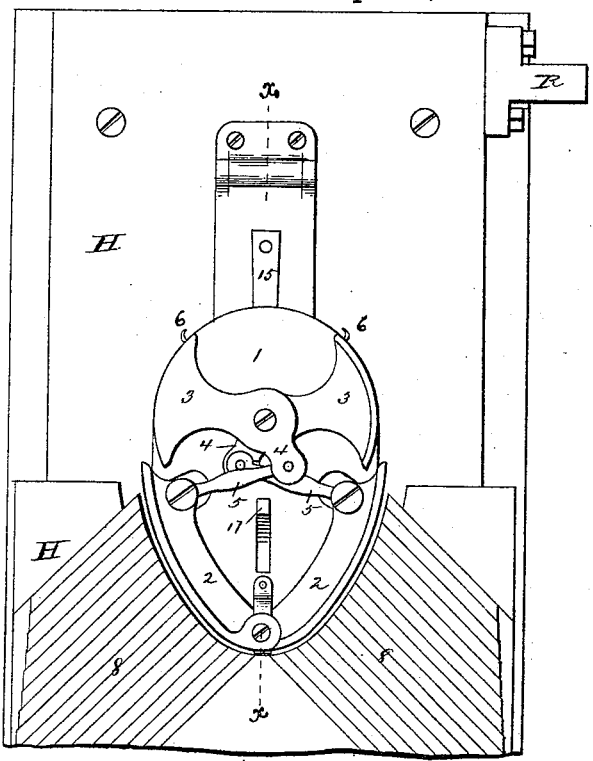
Figure 11:
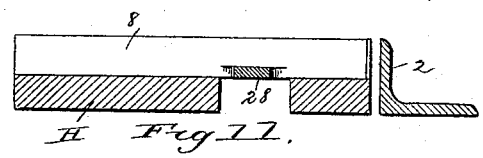
Figure 10:
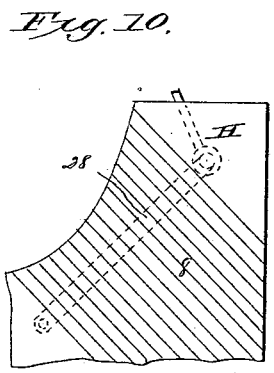
Figure 12:
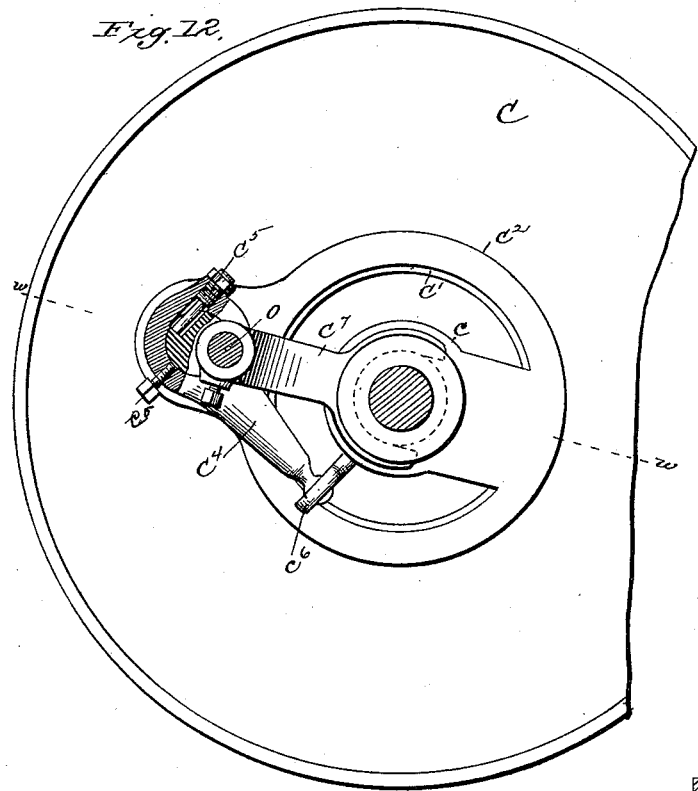
Figure 14:
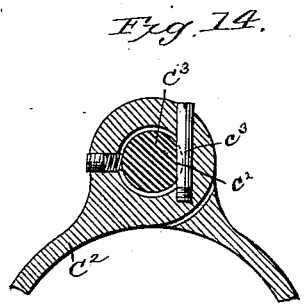
Figure 13:
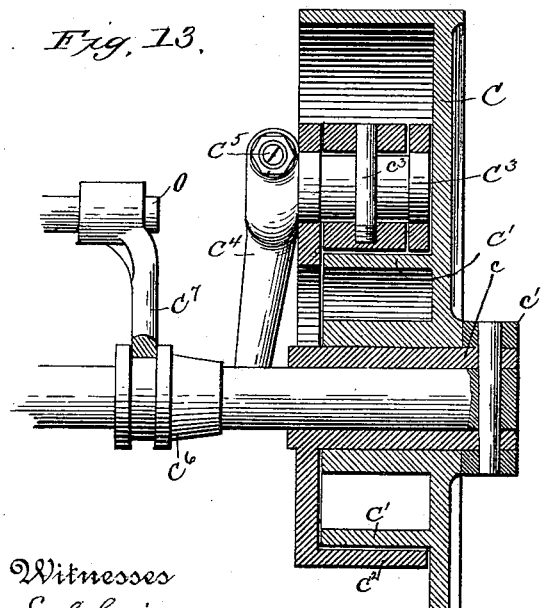
Figure 15:
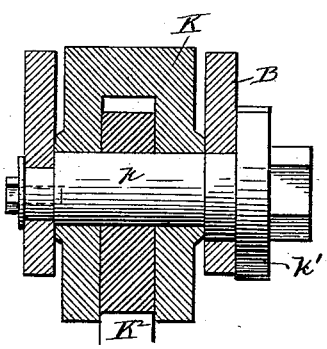

In the accompanying drawings, Figure 1 is a rear elevation of an ironing-machine constructed in accordance with the present invention. Fig. 2 is a vertical section looking toward the right-hand side. Fig. 3 is a similar view of the operating mechanism looking toward the left-hand side. Fig. 4 is a vertical cross-section taken through the upper frame in the line of the main shaft. Fig. 5 is a top plan view of the ironing-board with the parts in normal position. Fig. 6 is a similar view of the upper end of the board with the neckband-holder swung back into the position it occupies when the shirt is in place thereon. Fig. 7 is a section on the line $x\,x$, Fig. 6, with the holder depressed. Fig. 8 is a similar view with the holder elevated. Fig. 9 is a bottom plan of the ironing-board and clamp. Fig. 10 is a modification. Fig. 11 is a section of the same. Fig. 12 is an elevation of one of the clutches and pulleys. Fig. 13 is a section on line $w\,w$. Fig. 14 is a detail of the pin in the clutch. Fig. 15 is a detail of the cam-pin for elevating the table.

Similar letters of reference in the several figures indicate the same parts.

A indicates the stand or bottom portion of the frame, which may be bolted or otherwise rigidly fastened to the floor. In the upper portion of this frame is mounted a supplemental frame B, in which the operative parts of the machine are mounted. This supplemental frame B is pivotally supported, preferably, on bosses $b$, passing through bearings in the frame A, and is clamped and held in adjusted position by set-screws $b'$, working in slots $b^2$ in the frame A. Thus it will be seen said frame and the mechanism carried thereby may be adjusted to any desired angle to bring the table into the most convenient position for the operator.

The main shaft, through which motion is imparted to the mechanism, is preferably journaled in the bosses $b$ at the center of oscillation of the supplemental frame and has a drive-pulley C, to be hereinafter specifically described, mounted on each end. Inside the frame and between the left side and the bearing D, the gear-wheel D' is rigidly attached to the shaft, said wheel meshing with the idler $D^2$, which in turn drives the ironing-rollers E E, journaled at the upper end of the frame B, preferably in journal-boxes E', formed in a single casting, but separate from the supplemental frame and united thereto by bolts $e$.

A bearing $D^5$, corresponding to D, is formed on the frame B, and surrounding the shaft and journaled in these bearings are two bell-crank levers F, the upwardly-extending arms of which carry a drive-shaft F', having gear-wheels $F^2$ rigidly and a central wheel or roller $f$ loosely mounted thereon. Between the wheels $F^2$ and $f$ are mounted two pieces which I term "beams" $F^3$, which, extending substantially parallel with the ironing-rollers, connect the upper ends of links G, journaled in front and rear extensions $G'$ $G^2$, respectively, of the frame B, each pair of said links having a roller $f$ journaled between them in line with the central roller. Thus when said bell-crank levers are moved the rollers will be simultaneously raised or lowered.

The ironing-table H travels on the way formed by the rollers $f$, and is held down in position thereon and with the teeth of the rack-bars $h$ in engagement with the gear-wheels $F^2$ by the guides $h'$, pivoted on the boxes $F^4$, mounted rigidly in the bell-cranks, as shown. A gear-wheel I, having one section of a clutch provided with projections and interdental spaces thereon, is mounted loosely on the main shaft, being held in position thereon by the box $i$, journaled in bearings $D^5$, and collar $i'$, and meshes with the left-hand wheel $F^2$, motion being imparted thereto from the main shaft by the other clutch-section $I'$, keyed to the shaft and moved inward by the spring $I^2$ and outward by the shifting-arm $I^3$ on the shaft $I^4$, with its bearings in the frame and moved by the foot mechanism to be now described.

The forward extension $G'$ is bifurcated, and between the arms formed thereby a block K is mounted, preferably on an eccentric-pin $k$, controlled and held in position by the ratchet-wheel $k'$ and pawl $k^2$, and in this block is pivoted the foot-lever $K^2$. A rod $k^3$ unites the block and lever, its lower end being screw-threaded and passed through an opening in a projection on the lever with nuts $k^5$ above and below, thus forming a rigid but adjustable connection. This enables the position of the foot-lever to be adjusted to suit any operator.

The block K forms a cam, which engages the roller M, held between the forwardly-extending arms of the bell-cranks, as shown, and serves to elevate or lower the table, and at the same time, through the medium of the cam-surface $K^4$ and depending arm $I^5$ of the shifter, with the roller $i^5$ thereon, shifts the clutch-section $I'$ into or out of engagement with the section on the gear-wheel I. The cam-surface, it will be seen, is curved upward at each end, which portions coming in contact with the roller limit the movement of the cam. A single movement, then, of the foot-lever, it will be seen, moves the table into place and connects the mechanism for reciprocating the same. It might be added that for the sake of convenience the roller M has bosses $M^5$ on each side surrounding the shaft $M^6$, which form long bearings and properly position the roller, at the same time permitting it to revolve freely. Provision is also made whereby the table may be lowered out of contact with the rollers while the driving mechanism is connected. A catch N for this purpose, as well as to prevent the accidental release and dropping of the table when at the upper end, is pivoted between the forward links G and adapted to engage a shoulder $N'$ on the upper end of the block K to retain the same in partly-retracted position, with the clutch-sections still in engagement. An upwardly-extending arm $N^2$ on the catch is provided, with which a projection $N^3$ on the table engages when at the lower extreme of its movement to release the block, which permits it to swing in and disengage the clutch-sections and allow the table to come to rest. Should the operator desire to keep the table in motion, it is only necessary that the foot-lever be kept pressed back, as will hereinafter more clearly appear. While the tendency of the block and rear end of the lever is to remain depressed with the foot-piece elevated, both by reason of their own weight and the weight of the mechanism resting thereon, it is found desirable to supplement such tendency by a spring $K^6$, attached at one end to the block and at the other to a stationary part of the frame. Should it at any time become desirable or necessary to change the adjustment of the block to enable the same to elevate the table more or less, it can be easily accomplished by turning the eccentric-pin $k$ in one direction or the other.

The pulleys C on opposite ends of the main shaft normally run loose and are driven in opposite directions, enabling the shaft to be rotated in either direction by simply connecting the same to one or the other of the pulleys. In the preferred construction frictional band-clutches are employed to accomplish the desired end, each having an extended annular hub $c$, surrounding and rigidly attached to the shaft, on which hub the pulley C is journaled, being retained in position by the collar $c'$, as shown. Inside the pulleys are formed annular projections or bosses $C''$, which co-operate with the clutch-bands $C^2$, surrounding the same. The ends of the clutch-bands are bored out and a pin or shaft $C^3$ (see Fig. 14) inserted therein, having a flat section $c^2$ on one side, a pin $c^3$ being then inserted in one end of the clutch-band in position to engage the edges of said flat section, whereby when the pin or shaft $C^3$ is turned the two ends of the clutch will be drawn toward each other and the band tightened with great power. The mechanism for turning the shaft $C^3$ consists of a crank-arm $C^4$, mounted on the inner end of the shaft, with a screw $C^5$ therein for adjusting the angle of the arm and a set-screw $c^5$ for holding it in adjusted position, as shown clearly in Fig. 12. The inner end of the arm projects to one side of the main shaft, and a collar $C^6$, sliding longitudinally on the shaft, is connected thereto by a link $c^6$, as shown. Collar $C^6$ is shifted by a forked arm $C^7$, mounted on a shaft O, movable longitudinally in bearings at the back of the supplemental frame, said shaft being in turn moved from one position to the other, as follows: On the right-hand box $F^4$, outside of the guide $h'$, is loosely mounted a shifting-lever having three arms, the forward one P being connected to a foot-lever Q by a rod $q$, and the upper one P' provided with a shoulder or surface, with which the stops R at each end of the table come in contact, while the third or rearwardly-extending arm $P^2$ is connected to the shaft O through the medium of the link $p^2$ and bell-crank lever $P^3$. The bell-crank lever is preferably not connected directly to the shaft, but is connected to casing O', sliding on the shaft and inclosing two springs $o$, one on each side of a collar $O^2$, secured rigidly to the shaft, as shown in Fig. 1. The clutches at each end are duplicates, and the shaft O when shifted in one direction will close one and simultaneously open the other, causing the machine to reverse quickly and without undue jar or shock. The shifting-lever may be operated by the foot-treadle at any time or be operated by the stops R at each extreme movement of the table. Thus when the clutch-sections are thrown in engagement the table will reciprocate automatically from one extreme to the other.

The ironing-table H is straight on the under surface, and between the rack-bars $h$ is arranged a concave track $H^2$, which travels on the rollers $f$, which latter, it will be seen, are not perfectly level, the periphery of the center one, located between the ironing-rollers, being somewhat higher that the others. Thus when the pressure is brought to bear on the table it will be equalized between both ironing-rollers, which result it would be impracticable to accomplish were the table moved up and down by guides at points to either side of the ironing-rollers or by pressure-rollers acting at different points in the length of the table. To provide against accident in case the catch should become disengaged while the table is up, buffers S S are provided on the table, which come to rest against stops S' S' on the beams $F^3$.

The ironing-board proper, so to speak, is, as usual, preferably slightly separated from the bottom or bed piece, in order to allow the back of a shirt to pass between and the bosom to lie flat on the ironing-board, the bed being provided with guards or clothes-supports on each side, as shown in Fig. 4.

Great difficulty has heretofore been experienced in securing a mechanism which will hold the collar-band and top of the bosom firmly in place without injuring the same and at the same time allow the ironing-rollers to act over the whole bosom clear up to the band. This is partly due to the difficulty in producing a mechanism which, when made to fit one size of shirt, can be altered to fit another size, a further cause of the difficulty experienced being attributable to the fact that in starching the bosom and band they are necessarily mangled and pulled out of shape, and the operators before ironing the same have been in the habit of simply spreading them as well as possible and then clamping them down against the board, usually by means of a clamp fitting in a recess; but in none of the machines of which I am aware has a mechanism been provided which will hold any size band with equal facility and permit the ironing-rollers to act on every part of the bosom clear up to the band.

With the idea in view of overcoming the defects and of accomplishing the desiderata mentioned, I have designed a collar-band holder adapted to hold any sized bands and to stretch the same in the shape in which they are made, and in combination therewith have designed a table having an adjustable cut-out portion at the upper end. The collar-band holder is provided with a bottom piece or frame 1, the front end approximately the shape of the front of a collar-band and narrow enough to fit the smaller sizes, and at the front end of this bottom piece are pivoted two spreaders or shapers 2 2 of a form exactly corresponding to the patterns used in cutting out the neck portion and band of shirts, the various sizes being accommodated by moving the rear ends of the spreaders in or out, as will be readily understood by those skilled in shirt-cutting, such method being the one ordinarily employed to form different sizes. Two stretchers 3 3 are pivoted at a point slightly back of the center of the bottom piece and swing in arcs approximately the shape of the back of a collar. At the inner end of each stretcher is an arm or projection 4, connected by a link 5 to one of the shapers. Thus the movements of the shapers and spreaders will bear a certain relation to each other, and when a collar-band is passed around and the rear ends secured to the stretchers, as by having the button-holes placed over projections 6, the scretcher can move back and the shapers move outward only far enough to fit the particular size of band being operated upon. The shapers are preferably moved outward and the stretchers toward each other by spring-pressure, and the band held in position by the prong 7 passing through the front and the projections 6 through the back button-holes. In the preferred construction this holder is movably mounted on the ironing-table and passes down into the cut-out portion in the same, which is preferably made adjustable in order to conform to the different adjustments of the holder, which latter is adapted to lie flush with the surface of the table when depressed.

Many mechanisms, it is obvious, may be devised to carry out these ideas; but what appears to be the most practical and efficient consists in providing a series of longitudinally-movable bars or strips 8, seated in the table and forming the edge of the cut-out portion, the movement of the bars being in a direction to close the opening formed by the inward movement of the shapers, as shown clearly in Figs. 5 and 6, and in order to cause the simultaneous movement of the bars a proper distance to close the opening, the width of which is variable, levers 9 are pivoted beneath the bars (see Fig. 9) at a point nearly at the center of the table and extend transversely of the bars, being connected to the shapers by links 10 and downwardly-extending projections 11, working in cut-out portions of the bottom piece. The joints at each end of the link 10 are universal ones, which permit of the free movement of the shapers and bottom piece in any direction. Springs 12, connected to the levers 9, serve to hold all the parts in normal position.

Below the bottom piece 1 is formed a downwardly-projecting web 13, the lower end of which is pivotally connected to the support 14, and the latter is in turn pivotally connected at the rear end to the table, as shown.

15 is a flat spring mounted on the support 14 and bearing against the under side of the bottom piece to keep the same at all times thrown forward, and 16 is a small coiled spring beneath the support and tending to keep the support elevated, such movement being prevented by the engagement of the bottom piece 1 with the catch 17. This catch 17 is mounted on the table, and when the holder is depressed holds the same in such position, but when tilted back, as indicated in dotted lines, Fig. 7, and elevated, as in Fig. 8, engages the front of the web and holds the bottom piece, &c., in tilted position, as shown. The collar-band may then be easily adjusted to the shapers and stretchers, when a slight pressure on the back of the bottom piece or stretchers will cause the holder to be depressed; but not until the supporting-piece has reached the lowest level and the catch passed above the web is the holder permitted to tilt forward. Thus when it does close against or in proximity to the cut-out portion of the board it does so with a movement more or less in line with the surface of the board and prevents all liability or danger of the band being scraped off by contact with the edges as the holder moves to its seat.

The spring 16 is preferably of sufficient strength to lift the holder and other parts as soon as released from the catch, enabling the operator to bring the parts into position to readily remove the band by simply depressing the rear end of the holder.

Two forms of devices for holding and operating the bars 8 are shown, the one in Figs. 5 to 9, inclusive, consisting in forming the seat for the bars in the top of the table, with a series of slots through which pass bolts 17$^a$ for holding the bars in position and another series of slots through which studs or projections 18 pass to engage the lever connected to the shapers, as before explained.

In the modifications, Figs. 10 and 11, the bars are slotted or recessed on the under side and a bar 28 passed through the slots, as shown, said bar constituting the lever.

The ironing-rollers themselves are of a somewhat peculiar and novel construction, being provided with a series of spirally-arranged grooves (see Fig. 4) passing in opposite directions, thus cutting the surface into smooth diamond-shaped sections, each of small area, although collectively forming by far the larger part of the entire surface, the grooves being very fine. In the preferred construction the grooves will not exceed one-thirty-second of an inch in breadth and will be located one-eighth of an inch apart.

The object of grooving the surface of the rollers, as pointed out, is to secure the advantage of the action of a series of very small surfaces on the goods, as well as to permit the steam formed by the hot roller to escape through the grooves in either direction.

The ironing-rollers are hollow throughout and are heated by jets of gas fed through pipe 26, with a supply of air entering through pipe 27. Pipes for supplying both rolls are mounted on a single end casting 28, held by set-screw 29, which may be loosened and the casting and pipes withdrawn for lighting or examination of the jets. At the opposite end of the rolls is a smoke-box 29$^a$, formed in halves, with openings fitting the openings in the rolls, and a smoke-pipe 30 at the top. The halves of the box are held together in proper position by the screw 31, passing into the journal-box casting.

The textile covering on the table is drawn over the edges and inserted in grooves 33 and held in place by rods, which are slipped in longitudinally, as will be readily understood without further description.

The operation of ironing with this machine is very simple, it only being necessary to depress the far end of the holder and permit it to rise, then adjust the collar-band to position, by which the sliding bars will be advanced in position to close the space between the shapers and table, and then depress the holder and position the bosom on the table. The foot-lever is now pushed back and the clutch for moving the table back thrown into operation. The leverage exerted by the foot-lever and cam is very great. The latter, however, does not quite reach the dead-center. Thus any unusual thickness of material on the table tends to throw the foot-lever out slightly instead of stopping the machine. When the pressure is brought to bear, it will be noted that the table is practically supported by the center roller alone, and the ironing-rolls each have to bear a substantially equal proportion, thus causing each to do its quota of the work—a result not easily accomplished with other machines.

Should the operator desire to change the angle of the table, it may be easily accomplished by loosening the supplemental frame, adjusting the same, and again tightening the bolts in the slots at the sides.

Having thus described my invention, what I claim as new is—

1. In an ironing-machine, the combination, with the main frame or base, of a supplemental frame adjustably pivoted thereon, whereby its inclination may be varied, and the ironing-table and ironing-roll carried by said supplemental frame, substantially as described.

2. In an ironing-machine, the combination, with the main frame or base, of a supplemental frame pivoted thereon in horizontal bearings, with adjusting-connections between said frames and the ironing-table, and the ironing-roll mounted in said supplemental frame, substantially as described.

3. In an ironing-machine, the combination, with the main frame or base, of the movable supplemental frame and the horizontal main shaft passing through both said frames and forming the center of oscillation of the latter, and the ironing-rolls and table carried by said supplemental frame, substantially as described.

4. In an ironing-machine, the combination, with the frame, main shaft, ironing-rolls, table, and operating mechanism, of the independent drive-pulleys, and clutches for alternately throwing said pulleys into engagement with the shaft operated by the table, and an independent clutch between the table-operating mechanism and main shaft controlled by a foot-lever, substantially as described.

5. The combination, with the main shaft, reciprocating table driven thereby, and a clutch interposed between said shaft and table, of a lever for disengaging said clutch, and a catch operated by the table at a predetermined time to permit the disengagement of the lever to release the clutch, substantially as described.

6. The combination, with the two ironing-rolls and the reciprocating ironing-table beneath the same, of the way on which said table travels, having the central pressure-roller bearing against the under side of the table between the ironing-rolls to equalize the pressure, substantially as described.

7. In an ironing-machine, the combination, with the two parallel ironing-rollers and the reciprocating table beneath the same, of the way on which said table travels, mounted in movable bearings at both ends and having the central pressure-roller, whereby the pressure on the ironing-rolls may be equalized, substantially as described.

8. In an ironing-machine, the combination, with the ironing-roller and table reciprocating beneath the same, of the vertically-movable rollers forming the way for the table, connected for simultaneous movement, pivoted links in which said rollers are journaled, and a lever for moving said links to elevate or depress the table, substantially as described.

9. The combination, with the ironing-roller, reciprocating table, and drive-shaft having the gear thereon, of the bell-crank links pivoted on the drive-shaft and carrying a gear meshing with the gear thereon and connected at the upper end to the way, and a cam-lever operating said bell-cranks to shift the way, substantially as described.

10. The combination, with the ironing-roller, reciprocating table, and drive-shaft having the gear thereon, of the bell-crank links pivoted on the drive-shaft and carrying a gear meshing with the gear thereon, the way for the table connected to the upper arms of said bell-cranks, and the links at the end of the way pivotally connected to the frame, substantially as described.

11. In an ironing-machine, the combination, with the reciprocating table, of the way therefor, formed by the rollers connected by the beams, and supporting-links pivoted to the frame, substantially as described.

12. In an ironing-machine, the combination, with the reciprocating table having the concave track beneath the same, of the way formed by the convex rollers, whereby a slight tilting of the table is permitted, substantially as described.

13. In an ironing-machine, the combination, with the reciprocating table having the concave track beneath the same, of the way formed by the convex rollers united by the beams and mounted on pivoted links, whereby the table may be moved vertically and given a slight tilting movement, substantially as described.

14. In an ironing-machine, the combination, with the two ironing-rolls and reciprocating table below said rolls, of the way for said table, having an elevated bearing-point opposite a point between the rolls, whereby the pressure is brought to bear on both of the rolls equally, substantially as described.

15. In an ironing-machine, the combination, with the two ironing-rolls and reciprocating table below said rolls, of the way for the table formed by the series of rollers, the one of which opposite a point between the rollers is slightly above the level of the others, substantially as described.

16. In an ironing-machine, the combination, with the two ironing-rolls and reciprocating table, of the adjustable way for the table, having the elevated central roller opposite a point between the ironing-rolls, substantially as described.

17. The combination, with the ironing-rolls, table having the rack thereon, adjustable way therefor, drive-shaft, gear on the drive-shaft, loose gear on the main shaft for moving the table, and the clutch on the main shaft, adapted to connect the gear thereto, of the pivoted lever for elevating the way and operating the clutch, substantially as described.

18. In an ironing-machine, the combination, with the ironing-roll, table, adjustable way therefor, main shaft, with the gear for moving the table, and the spring-pressed clutch for throwing said gear into operation, of the lever co-operating with the way to elevate the same, the cam-surface on said lever, and the clutch-operating arm engaging said surface, substantially as described.

19. In an ironing-machine, the combination, with the adjustable way and bell-cranks for elevating the same, of the foot-lever, the cam operating the bell-cranks, and an adjustable connection between said cam and the foot-lever, substantially as described.

20. In an ironing-machine, the combination, with the adjustable way and bell-crank levers for elevating the same, of the cam operating the same to elevate the way, the foot-lever pivoted on the cam, and the screw-rod connecting the cam and foot-lever, whereby their relative positions may be adjusted, substantially as described.

21. In an ironing-machine, the combination, with the table, adjustable way, and bell-cranks for moving said way, of the foot-lever, the cam moved thereby and engaging the bell-cranks, and the cam-pin on which said cam is mounted, substantially as described.

22. In an ironing-machine, the combination, with the table, adjustable way, and bell-cranks for moving the way, of the foot-lever and cam connected thereto for moving the bell-cranks, having the shoulders at each end to limit the movement of the cam, substantially as described.

23. The combination, with an ironing-machine, of the ironing-table having the neckband-opening therein and the series of adjustable bars adjacent said opening on each side, whereby the size of the opening may be varied and the ironing-surface remain intact, substantially as described.

24. The combination, with an ironing-machine and the ironing-table having a neckband-opening therein, of the neckband-holder having spring-pressed stretching-arms for drawing the band around the holder, substantially as described.

25. The combination, with an ironing-machine and the ironing-table having the adjustable neckband-opening, of the adjustable neckband-holder fitting in said opening, and the stretcher-arms for drawing the band around the holder, substantially as described.

26. The combination, with an ironing-machine and the ironing-table having the neckband-opening at the upper end, of the adjustable neckband-holder fitting in said opening and pivotally connected to the ironing-table, the spring for elevating said holder, and the catch for holding the same depressed, substantially as described.

27. In a neckband-holder for ironing-machines, the combination, with the shapers pivoted at the forward end, of the spring-pressed stretchers for drawing the band around said shapers, and means, substantially as described, for attaching the ends of the bands thereto, as set forth.

28. In a neckband-holder for ironing-machines, the combination, with the base, of the shapers pivoted thereto at the forward end, the stretchers pivoted in rear of said shapers and connected thereto, and the springs for holding said shapers extended and the stretchers together, substantially as described.

29. The combination, with the ironing-table of an ironing-machine, having the neckband-opening therein, of the neckband-holder fitting in said opening and pivotally connected to its support, and a pivotal connection between said support and table, substantially as described.

30. The combination, with the ironing-table of an ironing-machine, having the neckband-opening therein, of the neckband-holder pivoted to its support, a pivotal connection between said support and the table, the spring for holding said support and holder elevated, and the catch for keeping it depressed, substantially as described.

31. The combination, with the reciprocating table of an ironing-machine, having the neckband-opening therein, of the neckband-holder pivoted to its support, a pivotal connection between said support and the table, a spring for tilting the holder forward, a spring for elevating the support, and a catch for holding said holder and support depressed, substantially as described.

32. The combination, with the table of an ironing-machine, having the neckband-opening therein, of the neckband-holder, its support, and pivotal connections between said parts, the springs for elevating the support and tilting the holder, the web at the front of the holder, and the catch engaging the web when the support is elevated to keep the holder tilted, substantially as described.

33. The combination, with the ironing-table having the neckband-opening therein, with the adjustable bars forming the edge of said opening, of the neckband-holder fitting in said opening and having the adjustable shapers at the front end, and connections between said shapers and bars whereby they are moved in unison to accommodate bands of different size, as set forth.

34. The combination, with the ironing-table having the neckband-opening therein, with the adjustable bars forming the edge of said opening, of the neckband-holder movable toward and from said opening, and the links connecting said bars and holder, having the universal joints at the ends, substantially as and for the purpose specified.

35. The combination, with the ironing-table having the neckband-opening therein, the bars forming the edge of said opening, and the levers pivoted at one end and engaging said bars, of the neckband-holder pivotally connected to the board and having the shapers pivotally connected thereto, and links connecting said shapers and lever, substantially as described.

36. The combination, with the ironing-table having the neckband-opening therein, the sliding bars forming the edge of said opening, and the levers pivoted at one end and engaging the bars, of the neckband-holder pivotally connected to the table and having the pivoted shapers and stretchers connected by links, and link connections between the shapers and levers, and the springs for holding said parts in normal position, substantially as described.

37. In an ironing-machine, the combination, with the main frame, of the ironing-rolls and table having their supports connected together and adjustably mounted on the main frame, whereby they may be tilted to suit different operators, substantially as described.

NEWMAN A. RANSOM.

Witnesses:
 ALEX. S. STEUART,
 A. KELLY.